US009751808B2

(12) United States Patent
Smyth et al.

(10) Patent No.: US 9,751,808 B2
(45) Date of Patent: Sep. 5, 2017

(54) METHOD FOR PYROLYZING PRECERAMIC POLYMER MATERIAL USING ELECTROMAGNETIC RADIATION

(71) Applicant: United Technologies Corporation, Farmington, CT (US)

(72) Inventors: Imelda P. Smyth, N Palm Beach, FL (US); Douglas M. Berczik, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 15/028,517

(22) PCT Filed: Sep. 30, 2014

(86) PCT No.: PCT/US2014/058155
§ 371 (c)(1),
(2) Date: Apr. 11, 2016

(87) PCT Pub. No.: WO2015/102692
PCT Pub. Date: Jul. 9, 2015

(65) Prior Publication Data
US 2016/0251267 A1  Sep. 1, 2016

Related U.S. Application Data

(60) Provisional application No. 61/890,362, filed on Oct. 14, 2013.

(51) Int. Cl.
| B28B 11/24 | (2006.01) |
| C04B 35/571 | (2006.01) |
| C04B 35/80 | (2006.01) |
| C04B 35/65 | (2006.01) |
| C04B 35/76 | (2006.01) |

(52) U.S. Cl.
CPC ............ *C04B 35/571* (2013.01); *C04B 35/65* (2013.01); *C04B 35/76* (2013.01); *C04B 35/806* (2013.01); *C04B 2235/3821* (2013.01); *C04B 2235/3826* (2013.01); *C04B 2235/3839* (2013.01); *C04B 2235/3843* (2013.01); *C04B 2235/3847* (2013.01); *C04B 2235/3865* (2013.01); *C04B 2235/3886* (2013.01); *C04B 2235/40* (2013.01); *C04B 2235/404* (2013.01); *C04B 2235/405* (2013.01); *C04B 2235/408* (2013.01); *C04B 2235/483* (2013.01); *C04B 2235/5244* (2013.01); *C04B 2235/667* (2013.01)

(58) Field of Classification Search
CPC ............ C04B 2235/667; B28B 11/241; B29C 35/0805; B29C 2035/0811; B29C 2035/0855
See application file for complete search history.

(56) References Cited

U.S. PATENT DOCUMENTS

| 5,072,087 A * | 12/1991 | Apte .................... C04B 35/111 156/272.4 |
| 5,643,512 A | 7/1997 | Daws et al. |
| 5,736,092 A * | 4/1998 | Apte .................... C04B 35/117 264/432 |
| 5,980,699 A | 11/1999 | Timmons et al. |
| 6,197,243 B1 * | 3/2001 | Tiegs .................... C04B 35/584 219/759 |
| 6,293,986 B1 | 9/2001 | Rodiger et al. |
| 6,699,810 B2 * | 3/2004 | Schwab ................ C04B 35/565 264/432 |
| 6,805,835 B2 | 10/2004 | Roy et al. |
| 7,306,828 B2 | 12/2007 | Barrera et al. |
| 2002/0006858 A1 | 1/2002 | Timmons |
| 2003/0102071 A1 | 6/2003 | Mako |
| 2003/0209838 A1 | 11/2003 | Schwab et al. |
| 2004/0129924 A1 * | 7/2004 | Stark ................... B29C 35/0272 252/500 |

(Continued)

FOREIGN PATENT DOCUMENTS

WO    02100798    12/2002

OTHER PUBLICATIONS

International Preliminary Report on Patentability for PCT Application No. PCT/US2014/058155 completed on Apr. 19, 2016.
The International Search Report and Written Opinion for PCT Application No. PCT/US2014/058155, mailed Jun. 30, 2015.
Goerke, O. Spray winding, a novel one-step spray-technology to perform CMCs from preceramic polymers. Journal of the European Ceramic Society 25 (2005) pp. 181-185.

(Continued)

*Primary Examiner* — Noah Wiese
(74) *Attorney, Agent, or Firm* — Carlson, Gaskey & Olds, P.C.

(57) ABSTRACT

Disclosed is a method for fabricating a ceramic material from a preceramic polymer material. The method includes providing a preceramic polymer material that has a preceramic polymer and an electromagnetic radiation-responsive component. The electromagnetic radiation-responsive component is selected from boron-containing compounds, cobalt, titanium, zirconium, hafnium, tantalum, tungsten, rhenium, nitrides of aluminum, nitrides of titanium, nitrides of zirconium, nitrides of hafnium, nitrides of tantalum, nitrides of tungsten, nitrides of rhenium, carbides of aluminum, carbides of titanium, carbides of zirconium, carbides of hafnium, carbides of tantalum, carbides of tungsten, carbides of rhenium and combinations thereof. An electromagnetic radiation is applied to the preceramic polymer material. The electromagnetic radiation interacts with the electromagnetic radiation-responsive component to generate heat that converts the preceramic polymer to a ceramic material.

20 Claims, 1 Drawing Sheet

(56) References Cited

U.S. PATENT DOCUMENTS

2004/0238794 A1* 12/2004 Karandikar ............ B01J 19/126
                                                                           252/500
2007/0138706 A1* 6/2007 Metzger .................. B01J 6/008
                                                                           264/432
2009/0069169 A1    3/2009  Bauer
2010/0215869 A1    8/2010  Jensen et al.
2013/0096217 A1    4/2013  Schmidt et al.

OTHER PUBLICATIONS

The Extended European Search Report for EP Application No. 14877300.5, dated May 16, 2017.

* cited by examiner

US 9,751,808 B2

METHOD FOR PYROLYZING PRECERAMIC POLYMER MATERIAL USING ELECTROMAGNETIC RADIATION

CROSS-REFERENCE TO RELATED APPLICATION

This application claims priority to U.S. Provisional Application No. 61/890,362, filed Oct. 14, 2013.

BACKGROUND

This disclosure relates to ceramic materials. Ceramic materials are known and used in articles that are subject to relatively severe operating conditions, such as gas turbine engine components. Ceramic materials can be fabricated using one of various known ceramic processing techniques. One technique is known as preceramic polymer pyrolysis, which in the context of a composite material is known as polymer infiltration and pyrolysis ("PIP"). Pyrolysis involves the thermal conversion of a preceramic polymer to a ceramic char in a controlled atmosphere.

SUMMARY

A method for fabricating a ceramic material from a preceramic polymer material according to an example of the present disclosure includes providing a preceramic polymer material that includes a preceramic polymer and an electromagnetic radiation-responsive component. The electromagnetic radiation-responsive component is selected from boron-containing compounds, cobalt, titanium, zirconium, hafnium, tantalum, tungsten, rhenium, nitrides of aluminum, nitrides of titanium, nitrides of zirconium, nitrides of hafnium, nitrides of tantalum, nitrides of tungsten, nitrides of rhenium, carbides of aluminum, carbides of titanium, carbides of zirconium, carbides of hafnium, carbides of tantalum, carbides of tungsten, carbides of rhenium and combinations thereof. Electromagnetic radiation is applied to the preceramic polymer material. The electromagnetic radiation interacts with the electromagnetic radiation-responsive component to generate heat that converts the preceramic polymer to a ceramic phase.

In a further embodiment of any of the foregoing embodiments, the electromagnetic radiation-responsive component is the boron-containing compound.

In a further embodiment of any of the foregoing embodiments, the boron-containing compound includes boron carbide.

In a further embodiment of any of the foregoing embodiments, the electromagnetic radiation-responsive component is the cobalt.

In a further embodiment of any of the foregoing embodiments, the electromagnetic radiation-responsive component is selected from the group consisting of nitrides of aluminum, nitrides of titanium, nitrides of zirconium, nitrides of hafnium, nitrides of tantalum, nitrides of tungsten, nitrides of rhenium, carbides of aluminum, carbides of titanium, carbides of zirconium, carbides of hafnium, carbides of tantalum, carbides of tungsten, carbides of rhenium and combinations thereof.

In a further embodiment of any of the foregoing embodiments, the electromagnetic radiation-responsive component is particulate dispersed through the preceramic polymer.

In a further embodiment of any of the foregoing embodiments, the preceramic polymer includes, by volume, 0.1%-10% of the electromagnetic radiation-responsive component.

In a further embodiment of any of the foregoing embodiments, the preceramic polymer includes, by volume, 0.1%-1% of the electromagnetic radiation-responsive component.

In a further embodiment of any of the foregoing embodiments, applying the electromagnetic radiation to the preceramic polymer material in an atmosphere of primarily argon, nitrogen or argon/nitrogen.

In a further embodiment of any of the foregoing embodiments, the electromagnetic radiation is microwave radiation.

A method for fabricating a ceramic material from a preceramic polymer material according to an example of the present disclosure includes providing a preform that includes a fiber structure and preceramic polymer material within the fiber structure. The preceramic polymer material includes a preceramic polymer and an electromagnetic radiation-responsive component. The electromagnetic radiation-responsive component is selected from boron-containing compounds, cobalt, titanium, zirconium, hafnium, tantalum, tungsten, rhenium, nitrides of aluminum, nitrides of titanium, nitrides of zirconium, nitrides of hafnium, nitrides of tantalum, nitrides of tungsten, nitrides of rhenium, carbides of aluminum, carbides of titanium, carbides of zirconium, carbides of hafnium, carbides of tantalum, carbides of tungsten, carbides of rhenium and combinations thereof. Electromagnetic radiation is applied to the preform. The electromagnetic radiation interacts with the electromagnetic radiation-responsive component to generate heat that converts the preceramic polymer to a ceramic phase.

In a further embodiment of any of the foregoing embodiments, the electromagnetic radiation-responsive component is the boron-containing compound.

In a further embodiment of any of the foregoing embodiments, the boron-containing compound includes boron carbide.

In a further embodiment of any of the foregoing embodiments, the electromagnetic radiation-responsive component is the cobalt.

In a further embodiment of any of the foregoing embodiments, the electromagnetic radiation-responsive component is particulate dispersed through the preceramic polymer.

In a further embodiment of any of the foregoing embodiments, the preceramic polymer includes, by volume, 0.1%-10% of the electromagnetic radiation-responsive component.

In a further embodiment of any of the foregoing embodiments, the electromagnetic radiation is microwave radiation.

In a further embodiment of any of the foregoing embodiments, the fiber structure includes silicon carbide fibers, and the ceramic phase is silicon carbide.

A ceramic material according to an example of the present disclosure includes a body including ceramic phase. The ceramic phase has dispersed there through an electromagnetic radiation-responsive component selected from the group boron-containing compounds, cobalt, titanium, zirconium, hafnium, tantalum, tungsten, rhenium, nitrides of aluminum, nitrides of titanium, nitrides of zirconium, nitrides of hafnium, nitrides of tantalum, nitrides of tungsten, nitrides of rhenium, carbides of aluminum, carbides of titanium, carbides of zirconium, carbides of hafnium, carbides of tantalum, carbides of tungsten, carbides of rhenium and combinations thereof.

In a further embodiment of any of the foregoing embodiments, the ceramic phase includes, by volume, 0.1%-10% of the electromagnetic radiation-responsive component.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
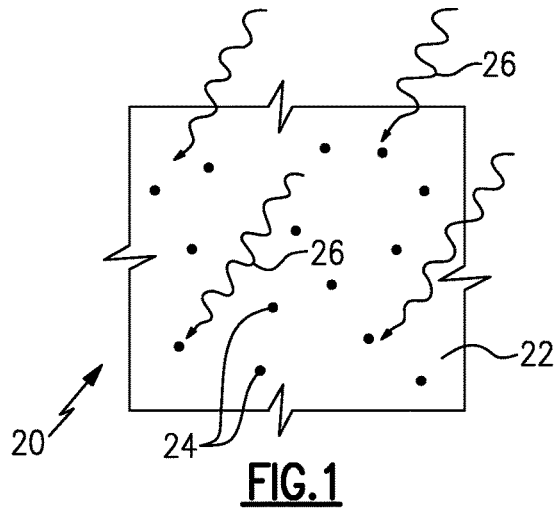
FIG. 1 illustrates a representative portion of a preceramic polymer material for use in a method of fabricating a ceramic material using electromagnetic radiation heating.

FIG. 1 schematically illustrates a representative portion of a preceramic polymer material 20 for use in a method of fabricating a ceramic material using electromagnetic radiation heating. Preceramic polymers can be heated in controlled gas environments, such as environments primarily of argon, nitrogen or argon/nitrogen, to a temperature at which the polymer decomposes to a dense ceramic char. Polycarbosilanes and polysiloxanes are two non-limiting example preceramic polymers that can be used with the disclosed method. Polycarbosilane has a carbon-silicon backbone and decomposes to silicon carbide (SiC). Polysiloxane has a silicon-oxygen backbone and decomposes to silicon oxycarbide (SiOC).

A preceramic polymer can be heated in a controlled gas environment using a furnace to convert the preceramic polymer to the ceramic material. However, furnace-heating requires substantial processing time to establish a desired controlled gas environment and heat to a target pyrolysis temperature. Thus, and particularly if multiple conversion cycles are used, such as in polymer infiltration and pyrolysis techniques, the long processing time increase fabrication cost.

Additionally, if the preceramic polymer forms a component of a composite structure, such as a matrix in a fiber-reinforced ceramic matrix composite, the long exposures to elevated temperatures can undesirably alter other materials in the structure. For example, the microstructures of fibers, such as but not limited to crystalline silicon carbide fibers, can be altered. Crystalline silicon carbide fibers, prior to thermal processing in a composite structure, have a controlled average microstructural grain size that is selected to provide good properties, such as strength. However, long exposures at elevated temperatures to form a composite structure with the fibers can cause grain growth in the fibers that alters, and debits, the fiber properties. As will be described herein, one application of the disclosed method enables shorter thermal exposure times, and thus limits or avoids altering other materials in the structure.

The preceramic polymer material 20 disclosed herein includes a preceramic polymer 22 and an electromagnetic radiation-responsive component 24. For example, the electromagnetic radiation-responsive component 24 is a material that is thermally responsive to electromagnetic radiation and is more thermally responsive to the electromagnetic radiation than the preceramic polymer.

In further examples, the electromagnetic radiation-responsive component 24 is a particulate material that is dispersed through the preceramic polymer 22 and is selected from materials that have a good thermal response to an applied electromagnetic radiation. For example boron-containing compounds, refectory metals such as cobalt, titanium, zirconium, hafnium, tantalum, tungsten, rhenium and combinations thereof are responsive to electromagnetic radiation, such as microwave radiation. One non-limiting example of the boron-containing compounds is boron carbide ($B_4C$). Other compounds of interest are refractory compounds such as nitrides and carbides. The nitrides or carbide can be selected from nitrides of aluminum, nitrides of titanium, nitrides of zirconium, nitrides of hafnium, nitrides of tantalum, nitrides of tungsten, nitrides of rhenium, carbides of aluminum, carbides of titanium, carbides of zirconium, carbides of hafnium, carbides of tantalum, carbides of tungsten, carbides of rhenium, and combinations thereof. One non-limiting example of these compounds is aluminum nitride. The cobalt can be pure or substantially pure cobalt or a cobalt-based alloy.

Figure 2:
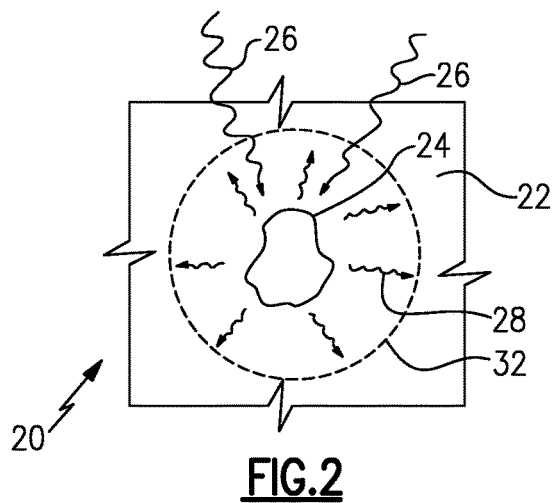
FIG. 2 illustrates a representative portion of the preceramic polymer material of FIG. 1 during electromagnetic radiation heating.
Figure 3:
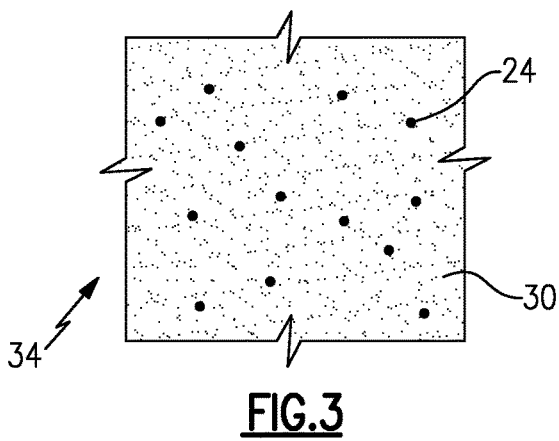
FIG. 3 illustrates a representative portion of a ceramic material fabricated using electromagnetic radiation heating.

FIG. 2 shows a representative view of one of the electromagnetic radiation-responsive components 24 in the preceramic polymer 22. Electromagnetic radiation 26 is applied to the preceramic polymer material 20. The electromagnetic radiation 26 interacts with the electromagnetic radiation-responsive component 24 to generate heat, represented at 28, which increases the temperature of the preceramic polymer 22 to convert the preceramic polymer 22 to a ceramic phase 30 (FIG. 3). For example, the generated heat heats a local area 32 of the preceramic polymer 22 around the electromagnetic radiation-responsive component 24 to convert the preceramic polymer 22 in the local area 32 into the ceramic phase 30.

The amount of the electromagnetic radiation-responsive component 24 used in the preceramic polymer material 20, the intensity of electromagnetic radiation, or both, can be varied to provide a desired thermal response for a given preceramic polymer 22. In some examples, preceramic polymer material 20 includes, by volume, 0.1%-10%. At relatively high levels above 1% the electromagnetic radiation-responsive component 24, which either remains in the ceramic phase 30 after conversion or is present in the ceramic phase as an alloying element, can influence the properties of the ceramic phase 30. If it is desirable to avoid or reduce the influence of the electromagnetic radiation-responsive component 24 on the properties of the ceramic phase 30, lower dopant amounts of the electromagnetic radiation-responsive component 24 can be used. In this regard, the amount of electromagnetic radiation-responsive component 24 in the preceramic polymer material 20 can be less than 5%, or even less than 1%. For microwave radiation and preceramic polymers that can be converted to silicon carbide, amounts toward the lower end of the range can be used.

FIG. 3 shows a representative portion of a ceramic material 34 after application of the electromagnetic radiation 26 and conversion of the preceramic polymer 22 to the ceramic phase 30. The ceramic phase 30 has the electromagnetic radiation-responsive component 24 dispersed there through. Depending on the final article being formed, the ceramic phase 30 can be used alone (monolithic) or in a composite material. For example, in composite materials, the ceramic phase 30 can be a matrix in a fiber-reinforced ceramic matrix composite.

As briefly discussed above, one application of the disclosed method enables shorter heat exposure times, and thus can be used to limit or avoid altering other materials in a composite structure. Furnace heating requires relatively long times to uniformly heat through the bulk of a material, from outside-in, over relatively long thermal conductance distances. By comparison, the heating in the disclosed method is localized around the electromagnetic radiation-responsive components 24 and is distributed through the bulk of the preceramic polymer material 20 such that the preceramic polymer material is heated evenly and over short thermal conductance distances in the local areas 32. Thus, less time is required to heat to a target temperature, reducing the amount of time that other materials in a composite structure are exposed to elevated temperatures. In particular, the growth of a controlled average microstructural grain size of crystalline fibers in a composite that is processing according to the disclosed method, such as silicon carbide fibers, can be limited.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for fabricating a ceramic material from a preceramic polymer material, the method comprising:
    providing a preceramic polymer material that includes a preceramic polymer and an electromagnetic radiation-responsive component, the electromagnetic radiation-responsive component selected from the group consisting of boron-containing compounds, nitrides of aluminum, nitrides of titanium, nitrides of zirconium, nitrides of hafnium, nitrides of tantalum, nitrides of tungsten, nitrides of rhenium, carbides of aluminum, carbides of titanium, carbides of zirconium, carbides of hafnium, carbides of tantalum, carbides of tungsten, carbides of rhenium and combinations thereof; and
    applying electromagnetic radiation to the preceramic polymer material, the electromagnetic radiation interacting with the electromagnetic radiation-responsive component to generate heat that converts the preceramic polymer to a ceramic phase.

2. The method as recited in claim 1, wherein the electromagnetic radiation-responsive component is the boron-containing compound.

3. The method as recited in claim 2, wherein the boron-containing compound includes boron carbide.

4. The method as recited in claim 1, wherein the electromagnetic radiation-responsive component is selected from the group consisting of nitrides of aluminum, nitrides of titanium, nitrides of zirconium, nitrides of hafnium, nitrides of tantalum, nitrides of tungsten, nitrides of rhenium, carbides of aluminum, carbides of titanium, carbides of zirconium, carbides of hafnium, carbides of tantalum, carbides of tungsten, carbides of rhenium and combinations thereof.

5. The method as recited in claim 1, wherein the electromagnetic radiation-responsive component is particulate dispersed through the preceramic polymer.

6. The method as recited in claim 1, wherein the preceramic polymer includes, by volume, 0.1%-10% of the electromagnetic radiation-responsive component.

7. The method as recited in claim 1, wherein the preceramic polymer includes, by volume, 0.1%-1% of the electromagnetic radiation-responsive component.

8. The method as recited in claim 1, including applying the electromagnetic radiation to the preceramic polymer material in an atmosphere of primarily argon, nitrogen or argon/nitrogen.

9. The method as recited in claim 1, wherein the electromagnetic radiation is microwave radiation.

10. The method as recited in claim 1, wherein the electromagnetic radiation-responsive component is selected from the group consisting of nitrides of aluminum, nitrides of titanium, nitrides of zirconium, nitrides of hafnium, nitrides of tantalum, nitrides of tungsten, nitrides of rhenium, and combinations thereof.

11. The method as recited in claim 10, wherein the electromagnetic radiation-responsive component is particulate dispersed through the preceramic polymer, and the preceramic polymer includes, by volume, 0.1%-1% of the electromagnetic radiation-responsive component.

12. The method as recited in claim 1, wherein the electromagnetic radiation-responsive component is selected from the group consisting of carbides of aluminum, carbides of titanium, carbides of zirconium, carbides of hafnium, carbides of tantalum, carbides of tungsten, carbides of rhenium and combinations thereof.

13. The method as recited in claim 12, wherein the electromagnetic radiation-responsive component is particulate dispersed through the preceramic polymer, and the preceramic polymer includes, by volume, 0.1%-1% of the electromagnetic radiation-responsive component.

14. A method for fabricating a ceramic material from a preceramic polymer material, the method comprising:
    providing a preform that includes a fiber structure and preceramic polymer material within the fiber structure, the preceramic polymer material includes a preceramic polymer and an electromagnetic radiation-responsive component, the electromagnetic radiation-responsive component selected from the group consisting of boron-containing compounds, nitrides of aluminum, nitrides of titanium, nitrides of zirconium, nitrides of hafnium, nitrides of tantalum, nitrides of tungsten, nitrides of rhenium, carbides of aluminum, carbides of titanium, carbides of zirconium, carbides of hafnium, carbides of tantalum, carbides of tungsten, carbides of rhenium and combinations thereof; and
    applying electromagnetic radiation to the preform, the electromagnetic radiation interacting with the electromagnetic radiation-responsive component to generate heat that converts the preceramic polymer to a ceramic phase.

15. The method as recited in claim 14, wherein the electromagnetic radiation-responsive component is the boron-containing compound.

16. The method as recited in claim 15, wherein the boron-containing compound includes boron carbide.

17. The method as recited in claim 14, wherein the electromagnetic radiation-responsive component is particulate dispersed through the preceramic polymer.

18. The method as recited in claim 14, wherein the preceramic polymer includes, by volume, 0.1%-10% of the electromagnetic radiation-responsive component.

19. The method as recited in claim 14, wherein the electromagnetic radiation is microwave radiation.

20. The method as recited in claim 14, wherein the fiber structure includes silicon carbide fibers, and the ceramic phase is silicon carbide.

* * * * *